(No Model.)
A. D. MOULTON & D. F. CROFUT.
AMMUNITION CHARGER.
No. 422,243. Patented Feb. 25, 1890.
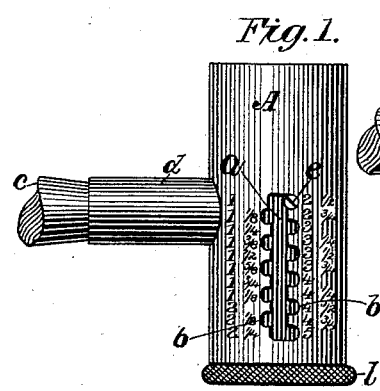
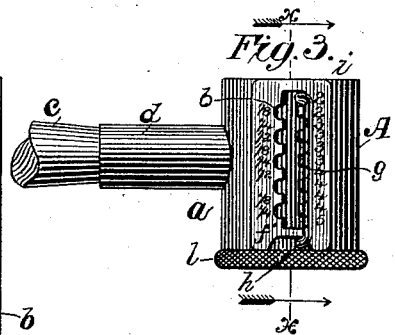
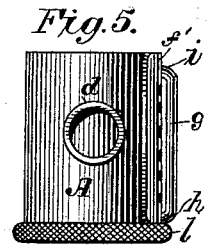
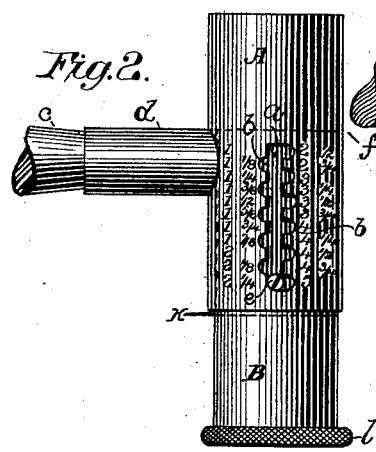
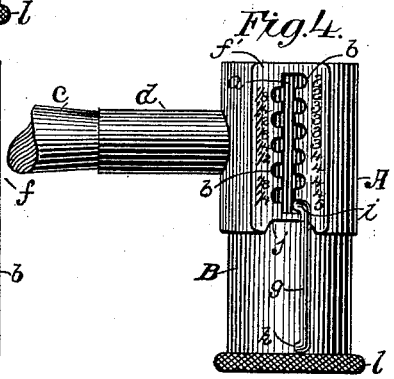
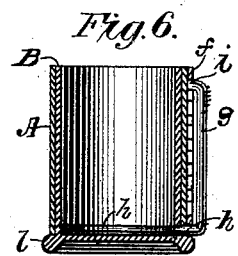
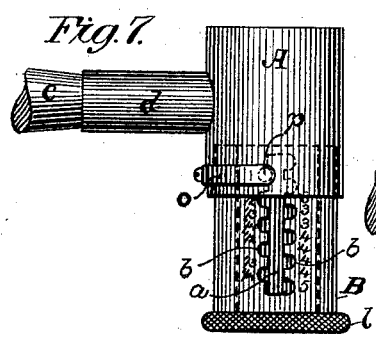
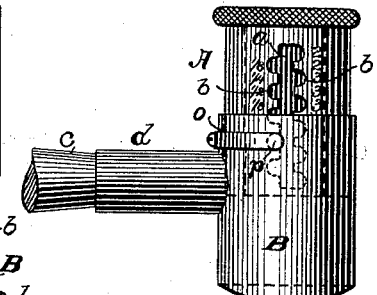
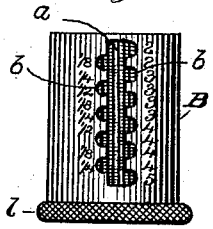
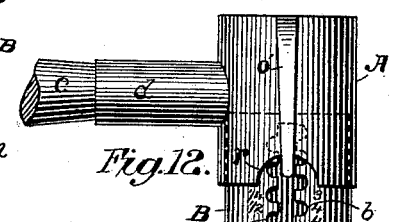
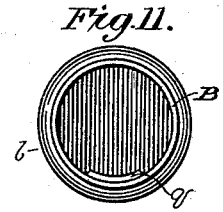
Witnesses
Wm. J. Tanner
A. J. Tanner
Inventors
Alvin D. Moulton
David F. Crofut
By Geo. D. Phillips

UNITED STATES PATENT OFFICE.

ALVIN D. MOULTON AND DAVID F. CROFUT, OF BRIDGEPORT, CONNECTICUT, ASSIGNORS TO HARTLEY & GRAHAM, OF NEW YORK, N. Y.

AMMUNITION-CHARGER.

SPECIFICATION forming part of Letters Patent No. 422,243, dated February 25, 1890.

Application filed October 9, 1889. Serial No. 326,366. (No model.)

*To all whom it may concern:*

Be it known that we, ALVIN D. MOULTON and DAVID F. CROFUT, citizens of the United States, residing at Bridgeport, in the county of Fairfield and State of Connecticut, have invented certain new and useful Improvements in Ammunition-Chargers; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention relates to ammunition-chargers, and is an improvement on that class having a combined cup and sliding shell, by means of which combination the capacity of the charger is increased or decreased, a series of graduating-notches cut through the shell engaging a pin projecting from the outer surface of the cup.

Our invention consists in the novel manner of arranging the graduating notches or stops on either the cup or shell, thereby greatly reducing the length of the charger without interfering with the capacity, thus saving in material and enabling it to be packed in a much smaller compass.

To more fully understand our invention, reference is had to the accompanying drawings, forming a part of this specification, in which—

Figure 1 represents an elevation of a closed charger of the form now in common use. Fig. 2 represents a view of the same opened or distended. Fig. 3 represents a closed charger embodying our invention. Fig. 4 represents the same opened or distended. Fig. 5 represents a view of Fig. 3, turned one-quarter around on its longitudinal axis. Fig. 6 represents a longitudinal sectional view of Fig. 3 through line $x$. Figs. 7, 8, 9, 10, 11, and 12 represent various modified forms of our device. Fig. 13 represents a longitudinal sectional view of the cup, showing the manner of securing a false bottom therein.

Its construction and operation are as follows: A represents the sliding shell; B, the cup; $a$, longitudinal opening having on each side a series of graduating-notches; $c$, section of wooden handle inserted in the ferrule $d$.

Heretofore chargers have been made such as shown in Figs. 1 and 2, the shell A having the graduating-notches cut through the same and near the lower end of said shell, so that when the charger is extended, as shown at Fig. 2, the notches will not project beyond the upper edge of the cup B, which upper edge is represented by dotted line $f$, as this would open communication with the interior of the charger and allow the contents to escape. Consequently it is necessary in such a construction to make the charger fully twice the length required, which length is represented by the aperture $a$, having the graduating-notches $b$.

Our improved device (seen in Fig. 3) has a cup and sliding shell similar to that shown in Fig. 1, except that their lengths are reduced at least one-half that of the latter. Instead of perforating through the shell to form the graduating-notches, said shell is left intact and the notches formed in the separate plate $f'$, which plate is attached to the outer surface of shell A, thus forming a solid backing for the notched aperture through said plate. The finger $g$, (see, also, Figs. 5 and 6,) having the extreme ends $h\ i$ bent at right angles, determine or locate the different graduations. The lower and longer end $h$ is rigidly attached to the cup. (See Fig. 6.) The upper shorter and free end $i$ passes through plate $f'$ and rests on the outer surface of the shell A, said end engaging with the graduating-notches of plate $f'$. The elongated notch $j$ (see Figs. 3 and 4) is formed through the lower end of plate $f'$ and shell A, to permit lateral movement of said shell and the engagement of end $i$ of finger $g$ with the upper notches. It also enables the lower edge of shell A to rest on the base $l$ of the cup B, thus bringing said cup and shell as close together as possible.

As before mentioned, the graduating-notches perforated through shell A of the device shown in Fig. 2 cannot extend beyond the top line $f$ of cup B. Therefore so much of shell A which projects beyond such line is waste material; but as the capacity of the charger is measured from the top this waste material is transferred to the bottom of the cup B, and this extra length or space filled up with a wooden plug, represented by the dotted line $k$.

In Fig. 7 may be seen a slight modification of our device. In this case the series of graduating-notches are perforated through the side of the cup B, and re-enforced by the plate $n$ on the interior of said cup, (see plan view, Fig. 8,) the graduating-scale being stamped on the exterior of same. Attached to the outer surface of shell A is the horizontal finger O, having on its free end the pin $p$. The free end of said pin resting against the re-enforcing-plate, said pin will engage with the graduating-notches $b$.

Fig. 9 represents a view similar to Fig. 7, except that the shell A is placed inside of the cup B and the bottom of said cup is slightly rounded. When the graduating-notches are formed on the cup or the shell when placed within the cup, as shown at Fig. 9, we may prefer to indent or stamp in the metal such graduations and deep enough to engage the finger. This is shown in Fig. 11. This will dispense with the re-enforce plate shown in Fig. 8.

In Fig. 12 the graduating-finger O, instead of being placed circumferentially around the shell A, is attached longitudinally thereto. An enlarged notch in the lower edge of shell A is provided to enable the graduating-scale on the outer surface of the cup to be readily seen, and this feature could also be employed on the devices shown in Figs. 7 and 9.

It is a difficult matter to establish the proper relation between the graduating-notches and the constantly-varying capacity of the charger, owing to the larger diameter of the shell as it projects beyond the top line of the cup, so that each of said notches shall represent the exact capacity in drams and ounces—$i.\,e.$, the charger must hold just the amount as indicated by the scale opposite each of the notches. This difficulty is usually overcome by placing a wooden plug surmounted by metal disk at the bottom of the cup. We prefer in place of such plug to roll the groove $r'$ (see sectional view of a cup in Fig. 13) into the surface of the cup, and place on the inner projection made by such groove the thin metal disk $s$ and hold the same in position by pins $t$, projecting through the cup and over said disk, or indenting the surface of the cup in one or more places just above the disk and after it has been seated.

The location of the graduating-notches and the finger engaging such notches (shown in the several views) carry out the same general principals, whether said notches are placed on the cup or shell, whether said notches are formed through a separate plate and attached to the shell, or said notches stamped through the cup and re-enforced by a plate on the interior of the same, or the said notches stamped into the cup or shell, as shown in Fig. 10, and without a re-enforced plate. We claim, therefore, to use any or all of these devices without departing from the spirit of our invention. We hold it to be a new feature in telescopic ammunition-chargers to construct the cup and shell of substantially the same length as the series of graduating-notches, so that the charger may be extended without opening communication through said notches to the interior of the charger.

Having thus described our invention, what we claim as new, and desire to secure by Letters Patent, is—

As an improvement in ammunition-chargers, the combination of two sections—viz., a cup and shell—arranged to move freely one within the other, a series of graduating-notches provided on either said cup or shell, said graduating-notches being substantially of the same length as said cup and shell, a solid backing placed between said notches and the interior of the charger, shutting off communication therewith through such notches when the two sections—viz., the cup and shell—are extended, and a finger rigidly attached to such section of the charger not provided with the graduating-notches, the free end of such finger engaging with the graduating-notches on the other section of said charger and by means of such engagement the capacity of the shell is graduated, substantially as shown and described.

In testimony whereof we affix our signatures in presence of two witnesses.

ALVIN D. MOULTON.
DAVID F. CROFUT.

Witnesses:
SAML. T. HOUGHTON,
WM. N. BEARDSLEY.